(12) United States Patent
Sato

(10) Patent No.: US 12,504,677 B2
(45) Date of Patent: Dec. 23, 2025

(54) CONTROL OF DISPLAY DEVICE FOR AUTONOMOUS VEHICLE

(71) Applicant: Micron Technology, Inc., Boise, ID (US)

(72) Inventor: Junichi Sato, Yokohama (JP)

(*) Notice: Subject to any disclaimer, the term of this patent is extended or adjusted under 35 U.S.C. 154(b) by 374 days.

(21) Appl. No.: 18/057,962

(22) Filed: Nov. 22, 2022

(65) Prior Publication Data

US 2023/0080734 A1 Mar. 16, 2023

Related U.S. Application Data

(63) Continuation of application No. 17/694,385, filed on Mar. 14, 2022, which is a continuation of application No. 16/397,965, filed on Apr. 29, 2019, now Pat. No. 11,294,265, which is a continuation of application
(Continued)

(51) Int. Cl.
*G03B 21/14* (2006.01)
*B60K 35/22* (2024.01)
*B60K 35/233* (2024.01)
*B60K 35/60* (2024.01)
*B60K 35/81* (2024.01)
*G02B 27/01* (2006.01)
*G03B 21/00* (2006.01)
*G06F 3/038* (2013.01)
*G06V 40/16* (2022.01)
(Continued)

(52) U.S. Cl.
CPC ............ *G03B 21/147* (2013.01); *B60K 35/22* (2024.01); *B60K 35/233* (2024.01); *B60K 35/60* (2024.01); *B60K 35/81* (2024.01); *G02B 27/0179* (2013.01); *G03B 21/006* (2013.01); *G06F 3/038* (2013.01); *G06V 40/168* (2022.01); *B60K 35/10* (2024.01); *B60K 35/28* (2024.01); *B60K 2360/334* (2024.01); *G02B 2027/014* (2013.01); *G02B 2027/0181* (2013.01)

(58) Field of Classification Search
CPC ................ G03B 21/147; G03B 21/006; G02B 27/0179; G02B 2027/014; G02B 2027/0181; G06F 3/038; G06V 40/168; B60K 2360/334; B60K 35/22; B60K 35/10; B60K 35/233; B60K 35/60; B60K 35/81; B60K 35/28; B60K 2360/175; B60K 2360/177; G06T 3/08
USPC ......................................................... 353/13
See application file for complete search history.

(56) References Cited

U.S. PATENT DOCUMENTS

| 6,750,832 B1 | 6/2004 | Kleinschmidt |
| 8,294,608 B1 | 10/2012 | Lynam |
| 9,317,895 B1 | 4/2016 | Tidwell |
(Continued)

FOREIGN PATENT DOCUMENTS

| DE | 10046019 | 3/2002 |
| DE | 102018201769 | 8/2023 |
(Continued)

*Primary Examiner* — Magda Cruz

(57) ABSTRACT

A display device of an autonomous vehicle is controlled based on data collected from sensors located in or on the vehicle. The display device is used to present one or more images to a driver and/or passengers of the autonomous vehicle. The display device can be, for example, a windshield and/or other window of the vehicle. Image data can be, for example, transformed to improve visual perception by passengers in the vehicle when the images are displayed on a curved shape of the windshield.

20 Claims, 3 Drawing Sheets

Related U.S. Application Data

No. 15/848,630, filed on Dec. 20, 2017, now Pat. No. 10,303,045.

(51) Int. Cl.
  *B60K 35/10* (2024.01)
  *B60K 35/28* (2024.01)

(56) References Cited

U.S. PATENT DOCUMENTS

| | | |
|---|---|---|
| 9,517,771 B2 | 12/2016 | Attard et al. |
| 9,870,649 B1 | 1/2018 | Fields et al. |
| 9,904,287 B1 | 2/2018 | Kuffner, Jr. et al. |
| 10,037,699 B1 | 7/2018 | Toyoda et al. |
| 10,303,045 B1 | 5/2019 | Sato |
| 10,894,545 B2 | 1/2021 | Bielby |
| 11,294,265 B2 * | 4/2022 | Sato ................ B60K 35/81 |
| 2002/0084950 A1 | 7/2002 | Aoki et al. |
| 2002/0089756 A1 | 7/2002 | Aoki et al. |
| 2006/0208169 A1 | 9/2006 | Breed et al. |
| 2008/0165084 A1 | 7/2008 | Giegold et al. |
| 2009/0278765 A1 | 11/2009 | Stringfellow |
| 2010/0253489 A1 | 10/2010 | Cui et al. |
| 2010/0253918 A1 | 10/2010 | Seder et al. |
| 2012/0099032 A1 | 4/2012 | Ishikawa |
| 2012/0173069 A1 | 7/2012 | Tsimhoni et al. |
| 2013/0307706 A1 | 11/2013 | Kriezman |
| 2015/0029013 A1 | 1/2015 | Osornio Lopez et al. |
| 2015/0088374 A1 * | 3/2015 | Yopp ................ B60S 1/0818 701/36 |
| 2015/0102980 A1 | 4/2015 | Pasca |
| 2015/0339589 A1 | 11/2015 | Fisher |
| 2015/0370272 A1 | 12/2015 | Reddy et al. |
| 2016/0023665 A1 * | 1/2016 | Sherony ................ G02B 27/01 701/2 |
| 2016/0042401 A1 | 2/2016 | Menendez et al. |
| 2016/0070898 A1 | 3/2016 | Kwok-Suzuki et al. |
| 2016/0104486 A1 | 4/2016 | Penilla et al. |
| 2016/0357015 A1 | 12/2016 | Yagi et al. |
| 2016/0368417 A1 | 12/2016 | Bassi et al. |
| 2017/0043664 A1 | 2/2017 | Rajendran |
| 2017/0054949 A1 | 2/2017 | Shaw |
| 2017/0054963 A1 | 2/2017 | Kasazumi et al. |
| 2017/0190288 A1 | 7/2017 | Torres Rios et al. |
| 2017/0213101 A1 | 7/2017 | Rubens et al. |
| 2017/0237944 A1 | 8/2017 | Haas |
| 2017/0240047 A1 | 8/2017 | Candelore |
| 2017/0307883 A1 | 10/2017 | Yamasaki |
| 2017/0309072 A1 | 10/2017 | Li et al. |
| 2018/0007414 A1 | 1/2018 | Li et al. |
| 2018/0082178 A1 | 3/2018 | Nakamura et al. |
| 2018/0114079 A1 | 4/2018 | Myers et al. |
| 2018/0129202 A1 | 5/2018 | Guo et al. |
| 2018/0130186 A1 | 5/2018 | Romanenko |
| 2018/0154854 A1 | 6/2018 | Thieberger et al. |
| 2018/0157035 A1 | 6/2018 | Fujita |
| 2018/0211414 A1 | 7/2018 | Cronin et al. |
| 2018/0252916 A1 | 9/2018 | Nakamura et al. |
| 2018/0254001 A1 | 9/2018 | Koren |
| 2018/0268564 A1 | 9/2018 | Sumikawa et al. |
| 2018/0270542 A1 | 9/2018 | Ramalingam et al. |
| 2018/0275667 A1 | 9/2018 | Liu et al. |
| 2018/0288605 A1 | 10/2018 | Griffin et al. |
| 2018/0345496 A1 | 12/2018 | Li et al. |
| 2019/0017839 A1 | 1/2019 | Eyler et al. |
| 2019/0031027 A1 | 1/2019 | Pala et al. |
| 2019/0049981 A1 | 2/2019 | Fischer |
| 2019/0121522 A1 | 4/2019 | Davis et al. |
| 2019/0129172 A1 | 5/2019 | Misawa et al. |
| 2019/0130800 A1 | 5/2019 | Kagawa et al. |
| 2019/0137759 A1 | 5/2019 | Hirata et al. |
| 2019/0187809 A1 | 6/2019 | Sato |
| 2019/0196188 A1 | 6/2019 | Hirata et al. |
| 2019/0258146 A1 | 8/2019 | Sato |
| 2019/0279026 A1 | 9/2019 | Sato et al. |
| 2019/0283761 A1 | 9/2019 | Bielby |
| 2019/0318492 A1 | 10/2019 | Kim et al. |
| 2019/0347879 A1 | 11/2019 | Motomura et al. |
| 2019/0370580 A1 | 12/2019 | Aoi et al. |
| 2020/0151611 A1 | 5/2020 | Mcgavran et al. |
| 2020/0402240 A1 | 12/2020 | Golov |
| 2021/0129852 A1 | 5/2021 | Bielby |
| 2022/0197120 A1 | 6/2022 | Sato |

FOREIGN PATENT DOCUMENTS

| | | |
|---|---|---|
| JP | 2000322565 | 11/2000 |
| WO | 2018145956 | 8/2018 |
| WO | 2018146048 | 8/2018 |
| WO | 2023020055 | 2/2023 |

* cited by examiner

CONTROL OF DISPLAY DEVICE FOR AUTONOMOUS VEHICLE

RELATED APPLICATIONS

The present application is a continuation application of U.S. patent application Ser. No. 17/694,385, filed Mar. 14, 2022, which is a continuation application of U.S. patent application Ser. No. 16/397,965, filed Apr. 29, 2019, issued as U.S. Pat. No. 11,294,265 on Apr. 5, 2022, which is a continuation of U.S. patent application Ser. No. 15/848,630, filed Dec. 20, 2017, issued as U.S. Pat. No. 10,303,045 on May 28, 2019 and entitled "Control of Display Device for Autonomous Vehicle," the disclosures of which applications are hereby incorporated by reference herein in their entirety.

FIELD OF THE TECHNOLOGY

At least some embodiments disclosed herein relate to control of display devices in general and more particularly, but not limited to controlling a display device of an autonomous vehicle.

BACKGROUND

Commuting is a major cause of stress due to the unpredictability and a sense of lost control due to traffic congestion, etc. Commuters also can experience boredom, social isolation, anger, and frustration from problems like traffic or other delays. Increased usage of autonomous vehicles may help to alleviate some of these problems. For example, autonomous vehicles help to reduce the stress of driving, and provide potential savings in travel cost.

However, commuters may continue to experience boredom even while riding in an autonomous vehicle. For example, usage of autonomous vehicles may become an incentive to live further away from cities, thus increasing travel distances. These longer commutes may still result in boredom during travel even though traveling in an autonomous vehicle.

Also, once automation in vehicles reaches higher levels and becomes more reliable, commuters in general may pay less attention to the road or other aspects of the trip. This reduced need for attention may further contribute to boredom when traveling in an autonomous vehicle.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
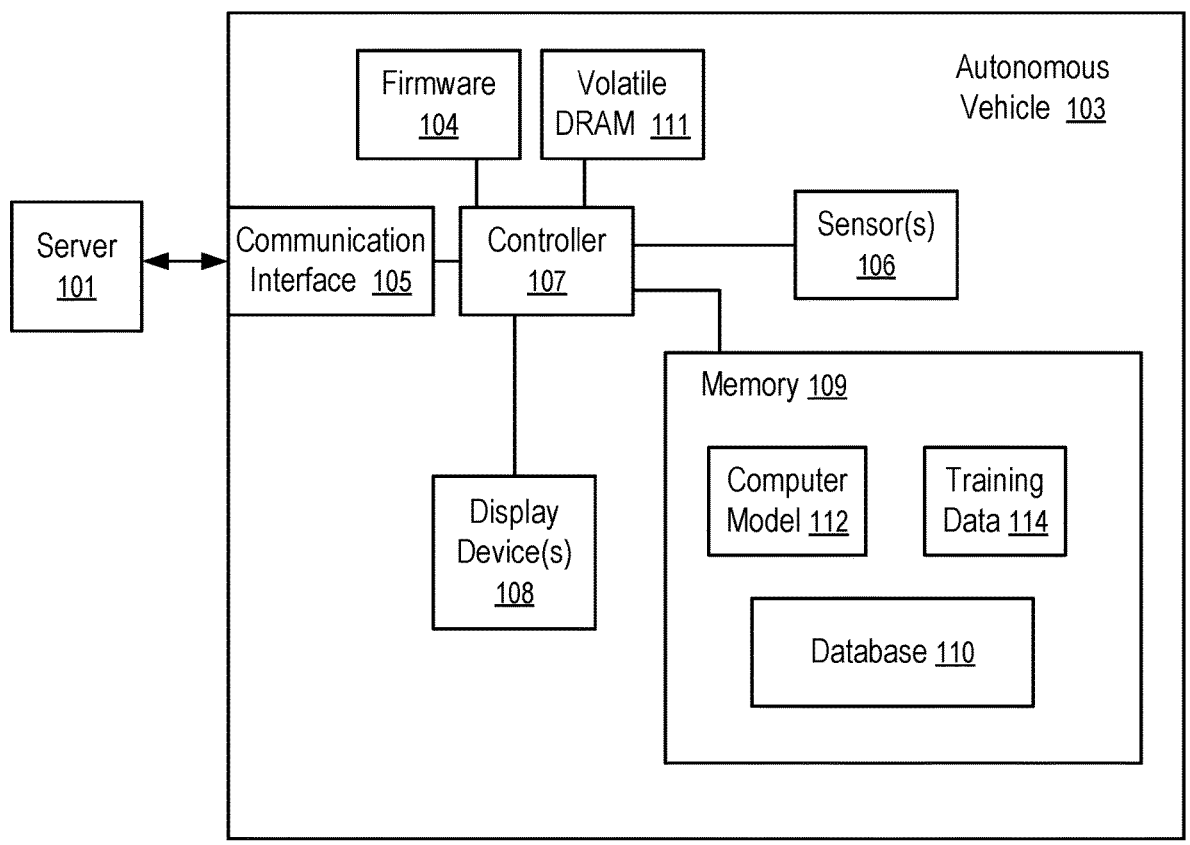
FIG. 1 shows a system for controlling a display device of an autonomous vehicle, according to one embodiment.

At least some embodiments disclosed herein provide systems and methods for controlling a display device (e.g., a windshield) of an autonomous vehicle. The display device is used to display one or more images to a driver and/or passengers of the autonomous vehicle. These images may be, for example, still photographs and/or videos such as movies or serial shows. In some cases, the images are presented only for viewing by the passengers, such as when the driver is operating the vehicle in a manual, or non-autonomous mode.

In some embodiments, the display device may be a windshield and/or other window of the vehicle. For example, the windshield may be used as a display device when the vehicle is being navigated in autonomous mode, in which case both the driver and passengers can safely view images on the windshield. In other embodiments, a projector and screen, a liquid crystal display, or other display device may be used to display images separately from or in addition to the windshield.

The display of images to the driver and/or passengers may reduce boredom by providing productive and/or entertaining activities in which to engage during travel in the vehicle. For example, a passenger may participate in an online course that is displayed to the passenger while traveling in the vehicle when commuting to work.

In general, although presenting a display to passengers during travel may reduce boredom of the driver and/or passengers, the interior of a vehicle is typically not designed to provide an environment fully suitable for the convenient or optimized display of images. For example, some vehicles use small video screens or monitors to present images, but such screens and monitors are not readily viewable by passengers in the vehicle due to their small size and/or awkward placement in the vehicle.

Also, presenting images to a driver and/or passengers can present a safety hazard. For example, the driver should solely focus on driving when a vehicle is operating in an non-autonomous mode. Also, large displays should not be presented to passengers when operating the vehicle in an non-autonomous mode because such a large display can distract the driver.

In various embodiments, the systems and methods for controlling a display device of an autonomous vehicle described below are used to determine a manner of control for a display device (e.g., determine an appropriate or desirable manner and/or time in which to present images). Some embodiments describe how to configure and/or control various aspects of a display device when presenting images to passengers. Other embodiments describe the use of sensors and other inputs provided to machine learning or other computer models that provide one or more outputs used to control various aspects of the operation of a display device in an autonomous vehicle.

In at least some embodiments disclosed herein, a display device is controlled in a way that transforms the windshield of the vehicle into a display device for presenting one or more images to passengers. Typically, a windshield has a curved shape and/or an oblique orientation in a vehicle that does not provide a desirable, flat surface for presenting images.

In one embodiment, images displayed on the windshield are generated by transforming image data in a manner that provides a presentation of the images for viewing such that the driver and/or passengers each perceive the images as being projected or displayed on a flat or substantially flat surface (e.g., a flat surface similar to that used for a public movie screen, or a private consumer television screen). For example, prior to such transformation, the image data may be data originally generated for use on a flat monitor or other display surface typically associated with use other than in moving vehicle.

Thus, by the various embodiments above, a display device that presents one or more images to a driver and/or passengers of an autonomous vehicle is controlled in a way that provides improved usability and/or viewability for the driver and passengers. In one embodiment, this control is based on data collected by one or more sensors located in the vehicle. In one embodiment, this control includes transformation of image data in a manner that is more suitable for display in the interior environment of an autonomous vehicle.

FIG. 1 shows a system for controlling a display device 108 of an autonomous vehicle 103, according to one embodiment. As illustrated in FIG. 1, a controller 107 controls the display of images on one or more display devices 108. As mentioned above, display device 108 can be, for example, a windshield of the autonomous vehicle 103. In another example, display device 108 can be a liquid crystal display that is integrated into the windshield, or integrated into a window of the autonomous vehicle 103.

The controller 107 may receive data collected by one or more sensors 106. The sensors 106 may be, for example, mounted in the autonomous vehicle 103. The sensors 106 may include, for example, a camera, a microphone, a motion detector, and/or a camera. The sensors 106 also may include, for example, sensors incorporated in wearable devices worn by the driver and/or passengers in the autonomous vehicle 103.

The sensors 106 may provide various types of data for collection by the controller 107. For example, the collected data may include image data from the camera and/or audio data from the microphone.

In one embodiment, the image data includes images of one or more faces of the driver and/or passengers. In another embodiment, the collected data includes biometric data for one or more persons in the autonomous vehicle 103. The biometric data may be provided, for example, by a wearable device.

In one embodiment, the display device 108 is an electroluminescent display (ELD). For example, the display device may be a flat panel display including a layer of electroluminescent material such as GaAs between two layers of conductors. When current flows through the conductors, the layer of electroluminescent material emits radiation in the form of visible light. Other examples include a windshield and/or window of a vehicle including an electroluminescent (EL) material (e.g., as an integrated layer) in which the EL material emits light (e.g., in response to an electric current being passed through it, or to the application of an electric field to the EL material).

In one embodiment, the controller 107 analyzes the collected data from the sensors 106. The analysis of the collected data includes providing some or all of the collected data as one or more inputs to a computer model 112. The computer model 112 can be, for example, an artificial neural network trained by deep learning. In another example, the computer model is a machine learning model that is trained using training data 114. The computer model 112 and/or the training data 114 can be stored, for example, in memory 109.

In one embodiment, memory 109 stores a database 110, which may include data collected by sensors 106 and/or data received by a communication interface 105 from computing device, such as, for example, a server 101. For example, this communication may be used to wirelessly transmit collected data from the sensors 106 to the server 101. The received data may include configuration, training, and other data used to configure control of the display devices 108 by controller 107.

For example, the received data may include data collected from sensors of autonomous vehicles other than autonomous vehicle 103. This data may be included, for example, in training data 114 for training of the computer model 112. The received data may also be used to update a configuration of a machine learning model stored in memory 109 as computer model 112.

In FIG. 1, firmware 104 controls, for example, the operations of the controller 107 in controlling the display devices 108 as described herein. The controller 107 also can, for example, run the firmware 104 to perform operations responsive to communications from the server 101. Firmware in general is a type of computer program that provides control, monitoring and data manipulation of engineered computing devices.

The autonomous vehicle 103 includes volatile Dynamic Random-Access Memory (DRAM) 111 for the storage of run-time data and instructions used by the controller 107 to improve the computation performance of the controller 107 and/or provide buffers for data transferred between the server 101 and memory 109. DRAM 111 is volatile in that it requires power to maintain the data/information stored therein, which data/information is lost immediately or rapidly when the power is interrupted.

Volatile DRAM 111 typically has less latency than non-volatile storage media, but loses its data quickly when power is removed. Thus, it is advantageous to use the volatile DRAM 111 to temporarily store instructions and data used for the controller 107 in its current computing task to improve performance. In some instances, the volatile DRAM 111 is replaced with volatile Static Random-Access Memory (SRAM) that uses less power than DRAM in some applications. When the memory 109 has data access performance (e.g., in latency, read/write speed) comparable to volatile DRAM 111, the volatile DRAM 111 can be eliminated; and the controller 107 can perform computing by operating on the memory 109 for instructions and data instead of operating on the volatile DRAM 111.

In one embodiment, memory 109 includes a non-volatile storage media, such as magnetic material coated on rigid disks, and/or memory cells in an integrated circuit. The storage media is non-volatile in that no power is required to maintain the data/information stored in the non-volatile storage media, which data/information can be retrieved after the non-volatile storage media is powered off and then powered on again.

In one embodiment, memory 109 is implemented using various memory/storage technologies, such as NAND gate based flash memory, phase-change memory (PCM), magnetic memory (MRAM), resistive random-access memory, and 3D XPoint, such that the memory 109 is non-volatile and can retain data stored therein without power for days, months, and/or years.

For example, cross point storage and memory devices (e.g., 3D XPoint memory) have data access performance comparable to volatile DRAM 111. A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers.

In one embodiment server 101 communicates with the communication interface 105 via a communication channel having a predetermined protocol to specify the locations of read/write operations using logical addresses.

In one embodiment, the server 101 can be a computer having one or more Central Processing Units (CPUs) to which vehicles, such as the autonomous vehicle 103, may be connected using a computer network. For example, in some implementations, the communication channel between the server 101 and the communication interface 105 includes a computer network, such as a local area network, a wireless local area network, a cellular communications network, or a broadband high-speed always-connected wireless communication connection (e.g., a current or future generation of mobile network link).

In some instances, the controller 107 has in-processor cache memory with data access performance that is better than the volatile DRAM 111 and/or the memory 109. In some instances, the controller 107 has multiple processors, each having its own in-processor cache memory.

In one embodiment, the controller 107 performs data intensive, in-memory processing using data and/or instructions organized in memory 109 or otherwise organized in the autonomous vehicle 103. For example, the controller 107 can perform a real-time analysis of a set of data collected and/or stored in the autonomous vehicle 103. For example, in some applications, the autonomous vehicle 103 is connected to real-time sensors 106 to store sensor inputs; and the processors of the controller 107 are configured to perform machine learning and/or pattern recognition based on the sensor inputs to support an artificial intelligence (AI) system that is implemented at least in part via the autonomous vehicle 103 and/or the server 101.

In some implementations, the processors of the controller 107 are integrated with memory (e.g., memory 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The autonomous vehicle 103 can interact with various computing systems, such as a cloud computing system, an edge computing system, a fog computing system, and/or a standalone computer. In a cloud computing system, remote computer servers are connected in a network to store, manage, and process data. An edge computing system optimizes cloud computing by performing data processing at the edge of the computer network that is close to the data source and thus reduces data communications with a centralized server and/or data storage. A fog computing system uses one or more end-user devices or near-user edge devices to store data and thus reduces or eliminates the need to store the data in a centralized data warehouse.

At least some embodiments of the systems and methods disclosed herein can be implemented using computer instructions executed by the controller 107, such as the firmware 104. In some instances, hardware circuits can be used to implement at least some of the functions of the firmware 104. The firmware 104 can be initially stored in non-volatile storage media, such as by using memory 109, or another non-volatile device, and loaded into the volatile DRAM 111 and/or the in-processor cache memory for execution by the controller 107.

For example, the firmware 104 can be configured to use the techniques discussed below for controlling display devices. However, the techniques discussed below are not limited to being used in the autonomous vehicle 103 of FIG. 1 and/or the examples discussed above.

Figure 2:
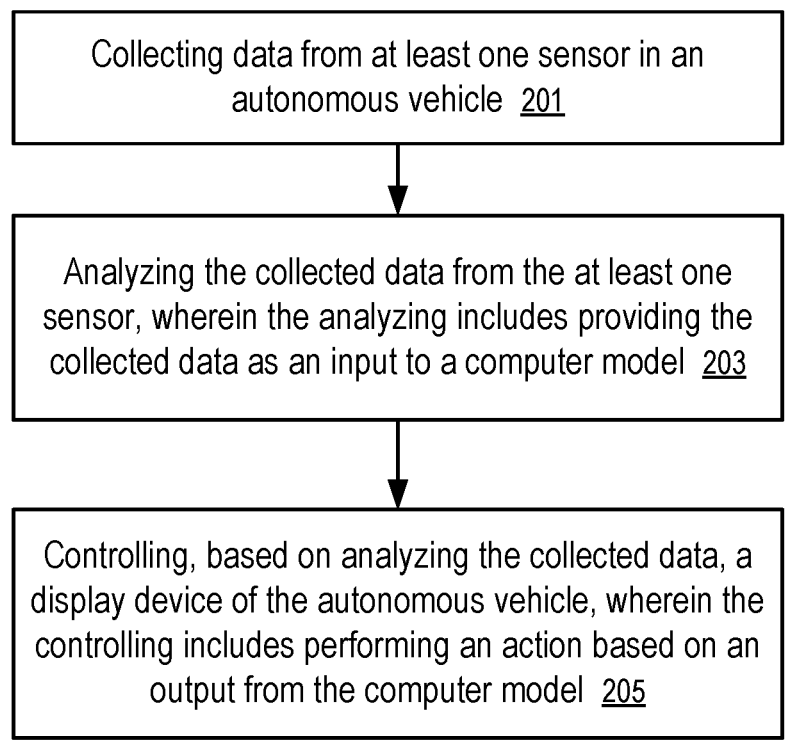
FIG. 2 shows a method to control a display device of an autonomous vehicle, according to one embodiment.

FIG. 2 shows a method to control a display device of an autonomous vehicle, according to one embodiment. At block 201, data is collected from one or more sensors in an autonomous vehicle. For example, the method can be implemented in the autonomous vehicle 103 of FIG. 1 using data collected from the sensors 106.

At block 203, the data collected from the one or more sensors is analyzed. This analysis may include providing some or all of the collected data as an input to a computer model. For example, the computer model may be stored in memory 109 and implemented by the controller 107 of FIG. 1, as was discussed above.

At block 205, one or more display devices are controlled based on the analysis of the collected data. For example, images can be generated and presented on one or more display devices 108 of FIG. 1.

The control of the display devices may include, for example, performing one or more actions by the controller 107 based on one or more outputs from the computer model 112. These actions may include, for example, control of the configuration of the display device 108. This control may include, for example, changing a state of the display device 108 from a transparent state to an opaque state. The opaque state is, for example, a state in which the display device, or a surface thereof, is suitable for the presentation of images to the driver and/or passengers.

In one embodiment, the method includes collecting, by at least one processor, data from at least one sensor in an autonomous vehicle; analyzing, by the at least one processor, the collected data from the at least one sensor, the analyzing comprising providing the collected data as an input to a computer model; and controlling, based on the analyzing the collected data, a display device of the autonomous vehicle, wherein the controlling comprises performing an action based on an output from the computer model.

In one embodiment, the at least one sensor comprises a sensor of a wearable computing device worn by a passenger of the autonomous vehicle.

In one embodiment, the method further comprises training the computer model using at least one of supervised or unsupervised learning, wherein the training is done using training data including at least a portion of the collected data.

In one embodiment, the collecting the data from the at least one sensor comprises receiving image data or audio data from the at least one sensor.

In one embodiment, the collected data comprises image data, and analyzing the collected data comprises performing facial recognition on the image data to identify facial features of at least one passenger of the autonomous vehicle. In one embodiment, the performing the facial recognition comprises extracting features from an image of a face of a first passenger to determine an emotional state of the first passenger.

In one embodiment, the collected data comprises biometric data corresponding to at least one passenger located in the autonomous vehicle.

In one embodiment, the at least one sensor comprises at least one of a motion detector, a camera, an accelerometer, or a microphone.

In one embodiment, the display device comprises at least one window of the autonomous vehicle, wherein the at least one window is transparent to permit passenger viewing of an environment outside of the autonomous vehicle, and wherein controlling the display device comprises changing a state of the at least one window to an opaque state such that the passenger viewing is blocked.

In one embodiment, the controlling the display device further comprises, subsequent to changing the state of the at least one window to the opaque state, generating an image on the at least one window, wherein the image is for viewing by a passenger of the autonomous vehicle.

In one embodiment, the display device comprises a liquid crystal display integrated into a windshield of the autonomous vehicle.

In one embodiment, a system for an autonomous vehicle used with the above methods includes: one or more sensors; a display device(s); at least one processor; and memory storing instructions configured to instruct the at least one processor to: collect data from the at least one sensor; analyze the collected data, wherein the analyzing comprises providing the data as an input to a machine learning model; and control, based on the analyzing the collected data, the display device, wherein the controlling comprises performing an action based on at least one output from the machine learning model.

In one embodiment, the display device comprises a liquid crystal display, and performing the action comprises generating at least one image for display by the liquid crystal display for viewing by a passenger of the autonomous vehicle.

In one embodiment, the display device comprises a windshield, the system further comprising a projector mounted in the autonomous vehicle, wherein controlling the display device comprises projecting at least one image onto a surface of the windshield.

In one embodiment, the display device comprises at least one window of the autonomous vehicle, and controlling the display device comprises changing a state of the at least one window to a transparent state that permits passenger viewing outside of the autonomous vehicle, wherein the instructions are further configured to instruct the at least one processor to: based on the at least one output from the machine learning model, select a route for controlling navigation of the autonomous vehicle.

In one embodiment, the system further comprises a communication interface configured to: wirelessly transmit the collected data to a computing device; and receive training data from the computing device; wherein a configuration of the machine learning model is updated using the training data.

In one embodiment, the training data comprises sensor data collected from at least one other autonomous vehicle. In one embodiment, the training data comprises at least one of: data collected by sensors that monitor at least one physical activity of persons inside fixed structures; electronic communications of persons; data regarding times of day and corresponding actions performed by the autonomous vehicle while carrying prior passengers; biometric data for prior passengers that have traveled in the autonomous vehicle; or data regarding input selections made in a user interface of the autonomous vehicle by prior passengers.

In one embodiment, dynamic creation of a scenic route is provided. AI is used to control a vehicle to drive people around and recognize their reaction, for example, to sites viewed outside of the vehicle. Based on positive and/or negative facial reactions detected by sensors 106 and/or along with other data associated with the people, a pleasurable or otherwise different scenic or other functional route is created and selected for navigation of the vehicle. For example, sensor devices (e.g., a camera and/or microphone) or wearable devices can be used to monitor passenger reactions at different segments of travel. In one embodiment, an optimized or other travel route can be selected based on reactions of similar passengers in the past.

Figure 3:
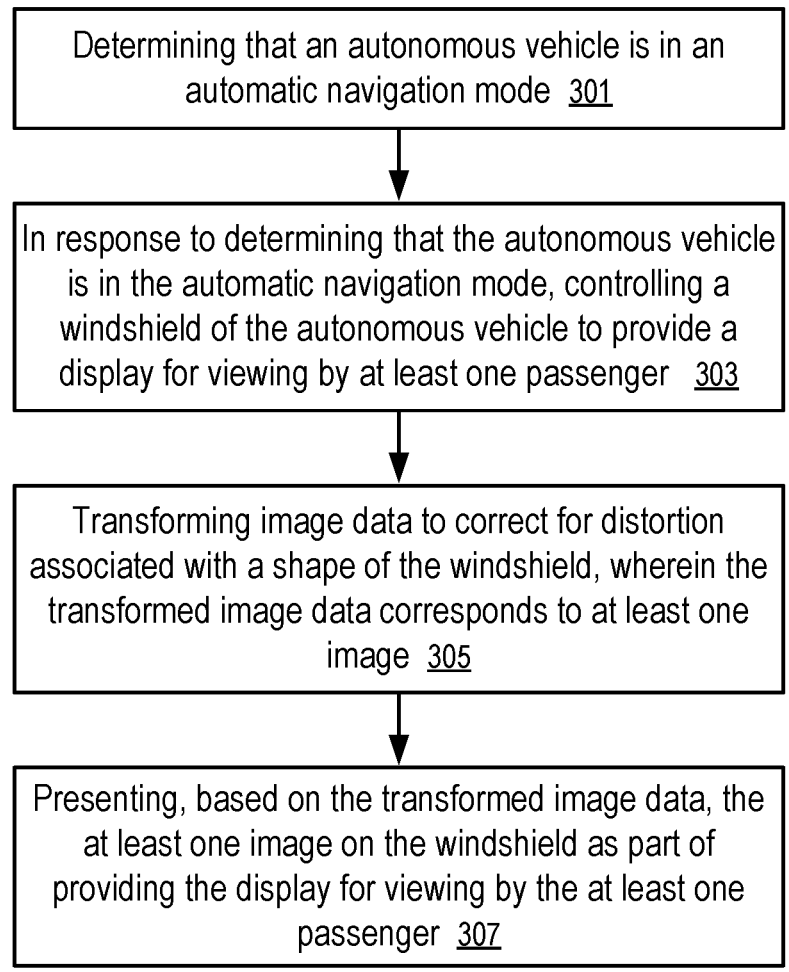
FIG. 3 shows a method to display one or more images on a windshield of an autonomous vehicle, according to one embodiment.

FIG. 3 shows a method to display one or more images on a windshield of an autonomous vehicle, according to one embodiment. For example, the method may be implemented for the autonomous vehicle 103.

At block 301, a determination is made whether an autonomous vehicle is in an automatic navigation mode. For example, it is desired that images not be displayed when the driver is manually navigating or otherwise controlling movement of the vehicle.

At block 303, in response to determining that the autonomous vehicle is in an automatic navigation mode, a windshield and/or other display device of the autonomous vehicle is controlled to provide a display for viewing by the driver and/or a passenger. For example, a state of the windshield may change from a transparent state to an opaque state. Also, a projector mounted in the autonomous vehicle they be activated to project images onto the windshield.

At block 305, image data is transformed to correct for distortion associated with the shape of the windshield and/or other display device. For example, image data may be obtained by wireless transmission from, for example, the server 101 via communication interface 105. The image data is, for example, transformed based on geometric and/or other transformations to provide transformed image data that is suitable for projection or other display onto the windshield or other display device.

At block 307, a presentation of images is provided to the driver or passengers based on the transformed image data in order to provide a display for viewing by persons in the autonomous vehicle.

In one embodiment, a non-transitory computer storage medium stores instructions that, when executed on a computing device (e.g., the controller 107), cause the computing device to perform a method for an autonomous vehicle, the method comprising: determining that the autonomous vehicle is in an automatic navigation mode; in response to determining that the autonomous vehicle is in the automatic navigation mode, controlling a windshield of the autonomous vehicle to provide a display for viewing by at least one passenger; transforming image data to correct for distortion associated with a shape of the windshield, wherein the transformed image data corresponds to at least one image; and presenting, based on the transformed image data, the at least one image on the windshield as part of providing the display for viewing by the at least one passenger.

In one embodiment, the distortion correction provided by transforming the image data flattens a visual presentation of the at least one image for viewing by a first passenger of the at least one passenger.

In one embodiment, the windshield turns into a "movie theater-like" screen or display. When the vehicle is in an auto-pilot mode, the controller 107 transforms the windshield into a display screen with image transformation that corrects the distortion in the shape of the windshield, such that the image appears to be presented on a flat surface according to the view point of each of one or more passengers in order to provide an improved viewing experience.

In various embodiments, a non-transitory computer storage medium is used to store instructions of the firmware 104. When the instructions are executed by the controller 107 of the autonomous vehicle 103, the instructions cause the controller 107 to perform any of the methods discussed herein.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully-functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
   at least one sensor of a vehicle; and
   at least one processor configured to:
   collect first data from the sensor;
   provide the collected first data as an input to a computer model;
   transform image data for viewing by at least one passenger of the vehicle;
   determine that the vehicle is in an autonomous navigation mode; and
   only in response to determining that the vehicle is in the autonomous navigation mode, display, based on an output from the computer model, the transformed image data.

2. The system of claim 1, wherein the image data is transformed based on a characteristic associated with a window of the vehicle.

3. The system of claim 2, wherein the characteristic is a shape of the window.

4. The system of claim 1, further comprising a communication interface configured to communicate with a server, wherein the processor is further configured to receive training data from the server.

5. The system of claim 4, wherein the vehicle is a first vehicle, and the training data comprises sensor data collected from sensors of a second vehicle.

6. The system of claim 1, wherein the image data is transformed for a respective view point of each of a plurality of passengers in the vehicle.

7. The system of claim 1, wherein the transformed image data is displayed on a window of the vehicle.

8. A system comprising:
at least one sensor of a vehicle; and
at least one processor configured to:
- collect first data from the sensor;
- provide the collected first data as an input to a computer model trained using biometric data of passengers of the vehicle that have viewed an image on a window of the vehicle;
- transform image data for viewing by a first passenger of the vehicle;
- determine that the vehicle is in an autonomous navigation mode; and
- in response to determining that the vehicle is in the autonomous navigation mode, display, based on an output from the computer model, the transformed image data.

9. The system of claim 8, wherein the window comprises a windshield, and displaying the transformed image data comprises projecting the transformed image data onto a surface of the windshield.

10. The system of claim 8, wherein displaying the transformed image data comprises changing a state of the window to an opaque state.

11. The system of claim 8, wherein the computer model is trained further using input selections made in a user interface of the vehicle by the passengers of the vehicle.

12. The system of claim 8, wherein the first data comprises image data obtained from a camera of the vehicle.

13. The system of claim 8, wherein the first data comprises image data associated with at least one facial feature of the first passenger.

14. The system of claim 8, wherein the image data is transformed based on geometric transformations.

15. The system of claim 8, wherein transforming the image data flattens a visual presentation of at least one image for viewing by the first passenger.

16. A system comprising:
at least one first sensor;
at least one second sensor of a computing device worn by a passenger of a vehicle; and
at least one processor configured to:
- collect first data obtained from the first and second sensors;
- provide the collected first data as an input to a computer model of the vehicle;
- transform image data for viewing by the passenger; and
- display, based on an output from the computer model, the transformed image data.

17. The system of claim 16, wherein the processor is further configured to determine that the vehicle is in an autonomous navigation mode, and wherein the displaying of the transformed image data is performed in response to determining that the vehicle is in the autonomous navigation mode.

18. The system of claim 16, wherein the vehicle is a first vehicle, and the first sensor is configured in a second vehicle.

19. The system of claim 16, wherein the computer model was trained using biometric data of passengers of the vehicle.

20. The system of claim 16, wherein the vehicle is a first vehicle, and the computer model was trained using data obtained from at least one sensor of a second vehicle.

* * * * *